(12) United States Patent
Abe et al.

(10) Patent No.: US 7,985,502 B2
(45) Date of Patent: Jul. 26, 2011

(54) NONAQUEOUS ELECTROLYTE SOLUTION AND LITHIUM SECONDARY BATTERY USING SAME

(75) Inventors: Koji Abe, Yamaguchi (JP); Kazuhiro Miyoshi, Yamaguchi (JP); Takaaki Kuwata, Yamaguchi (JP)

(73) Assignee: Ube Industries, Ltd., Ube-shi (JP)

( * ) Notice: Subject to any disclaimer, the term of this patent is extended or adjusted under 35 U.S.C. 154(b) by 1105 days.

(21) Appl. No.: 10/592,702

(22) PCT Filed: Mar. 18, 2005

(86) PCT No.: PCT/JP2005/004923
§ 371 (c)(1),
(2), (4) Date: Sep. 13, 2006

(87) PCT Pub. No.: WO2005/091422
PCT Pub. Date: Sep. 29, 2005

(65) Prior Publication Data
US 2008/0241704 A1 Oct. 2, 2008

(30) Foreign Application Priority Data

Mar. 22, 2004 (JP) .................................. 2004-082663
Mar. 22, 2004 (JP) .................................. 2004-082664

(51) Int. Cl.
*H01M 6/04* (2006.01)
(52) U.S. Cl. ........ 429/200; 429/326; 429/330; 429/332; 429/333; 429/231.1; 429/341; 429/231.95
(58) Field of Classification Search .................. 429/326, 429/330, 332, 333, 200, 231.1, 341, 231.95
See application file for complete search history.

(56) References Cited

U.S. PATENT DOCUMENTS

| | | | |
|---|---|---|---|
| 3,413,154 A | 11/1968 | M. L. Bhaskara Rao | |
| 7,300,723 B2 * | 11/2007 | Fukuoka et al. | 429/341 |
| 2004/0170903 A1 | 9/2004 | Fukuoka et al. | |

FOREIGN PATENT DOCUMENTS

| | | | |
|---|---|---|---|
| JP | 63-969 | * | 1/1988 |
| JP | 63 114076 | | 5/1988 |
| JP | 03 295178 | | 12/1991 |
| JP | 06 020719 | | 1/1994 |
| JP | 08 293323 | | 11/1996 |
| JP | 08 339825 | | 12/1996 |
| JP | 10 092722 | | 4/1998 |
| JP | 11-135374 | | 5/1999 |
| JP | 11-273724 | | 10/1999 |
| JP | 11-273725 | | 10/1999 |
| JP | 2000 113906 | | 4/2000 |
| JP | 2004 063432 | | 2/2004 |
| KR | 2003-0066046 | | 8/2003 |

OTHER PUBLICATIONS

U.S. Appl. No. 12/791,085, filed Jun. 1, 2010, Abe et al.

* cited by examiner

*Primary Examiner* — Laura S Weiner
(74) *Attorney, Agent, or Firm* — Oblon, Spivak, McClelland, Maier & Neustadt, L.L.P.

(57) ABSTRACT

The present invention provides a lithium secondary battery having excellent battery characteristics such as battery cycling property, electrical capacity and storage property.
The present invention relates to a nonaqueous electrolytic solution for lithium secondary batteries in which an electrolyte salt is dissolved in a nonaqueous solvent, the nonaqueous electrolytic solution comprising a formic ester compound having a specific structure in an amount of 0.01 to 10% by weight of the nonaqueous electrolytic solution, and a lithium secondary battery using the same.

11 Claims, No Drawings

NONAQUEOUS ELECTROLYTE SOLUTION AND LITHIUM SECONDARY BATTERY USING SAME

TECHNICAL FIELD

The present invention relates to a nonaqueous electrolytic solution and a lithium secondary battery using the same, more specifically to a nonaqueous electrolytic solution which can provide a lithium secondary battery having excellent battery characteristics such as battery cycling property, electrical capacity and storage property, and to a lithium secondary battery using the same.

BACKGROUND ART

In recent years, lithium secondary batteries are widely used as driving power supplies for small electronic devices and the like. Such lithium secondary batteries are mainly constituted of a positive electrode, a nonaqueous electrolytic solution and a negative electrode, and in particular, in which a lithium compound oxide such as $LiCoO_2$ is used as the positive electrode and a carbon material or lithium metal as the negative electrode. The nonaqueous electrolytic solution for use in such lithium secondary battery includes carbonates such as ethylene carbonate (EC) and propylene carbonate (PC).

However, secondary batteries having better characteristics, i.e., the battery cycling property and electrical capacity are needed.

In a lithium secondary battery in which $LiCoO_2$, $LiMn_2O_4$, $LiNiO_2$ or the like is used as the positive electrode, part of a solvent in a nonaqueous electrolytic solution locally decomposes oxidatively during charging, and the decomposition products inhibit a desirable electrochemical reaction of the battery, thereby lowering the battery performance. This is thought to result from the electrochemical oxidation of the solvent at the interface between the positive electrode material and the nonaqueous electrolytic solution.

Moreover, in another lithium secondary battery using, highly crystallized carbon materials such as natural graphite and artificial graphite as the negative electrode, a solvent in a nonaqueous electrolytic solution reductively decomposes on the surface of the negative electrode during charging. Therefore, part of ethylene carbonate (EC) which is generally and widely used as a nonaqueous electrolytic solution solvent is also reductively decomposed through repeated charging and discharging, thereby lowering the battery performance.

As substances which improve the battery characteristics of this lithium secondary battery, patent document 1 discloses ethyleneglycol diacetate; patent document 2 discloses acetates such as butyl acetate and diacetates such as ethylene diacetate; patent document 3 discloses vinyl acetate; and patent document 4 discloses allyl acetate. These documents suggest improved cycle life. Moreover, patent document 5 discloses a secondary battery with increased oxidation resistance and improved charge/discharge capacity by optimizing the concentration of a lithium salt by using aliphatic esters such as methyl formate. However, in order to increase the capacities of lithium secondary batteries, nonaqueous electrolytic solutions and lithium secondary batteries having even better cycling properties and electrical capacities are needed.

Patent document 1: Japanese Unexamined Patent Publication No. H07-272756
Patent document 2: Japanese Unexamined Patent Publication No. H09-97626
Patent document 3: Japanese Unexamined Patent Publication No. H11-273724
Patent document 4: Japanese Unexamined Patent Publication No. H11-273725
Patent document 5: Japanese Unexamined Patent Publication No. H09-306538

DISCLOSURE OF INVENTION

An object of the present invention is to solve the above-mentioned problems relating to nonaqueous electrolytic solutions for lithium secondary batteries, and to provide a nonaqueous electrolytic solution which can constitute a lithium secondary battery having excellent battery cycling property, and further excellent battery characteristics such as electrical capacity and storage property during charging, and to provide a lithium secondary battery using the same.

Specifically, the present invention provides a nonaqueous electrolytic solution for lithium secondary batteries including an electrolyte salt dissolved in a nonaqueous solvent, the nonaqueous electrolytic solution comprising any one of the formic ester compounds represented by general formulae (I) to (IV) shown below in the nonaqueous electrolytic solution in an amount of 0.01 to 10% by weight of the nonaqueous electrolytic solution:

[Chemical formula 1]

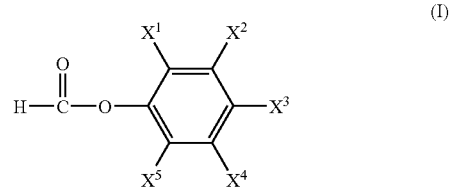

(where $X^1$ to $X^5$ independently represents a hydrogen atom, a halogen atom, a $C_1$ to $C_6$ linear or branched alkyl group, a cyclohexyl group or a phenyl group.)

[Chemical formula 2]

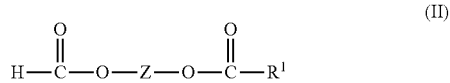

(where $R^1$ represents a hydrogen atom, a $C_1$ to $C_{12}$ linear or branched alkyl group, a $C_3$ to $C_8$ cycloalkyl group or a $C_6$ to $C_{12}$ aryl group; and Z represents a $C_2$ to $C_{12}$ saturated or unsaturated hydrocarbon group.)

[Chemical formula 3]

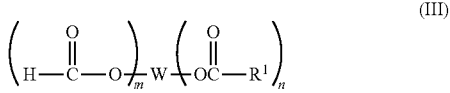

(where m represents an integer of 1 to 4; n represents an integer of 0 to 3; W represents a $C_3$ to $C_8$ (m+n)-valent linking group constituted of carbon atoms and hydrogen atoms; (m+n) is 3 or 4; and $R^1$ is the same as above.)

[Chemical formula 4]

(Y represents a $C_4$ to $C_{20}$ linear or branched alkyl group, a $C_2$ to $C_{20}$ linear or branched alkenyl group or a $C_2$ to $C_{20}$ linear or branched alkynyl group.)

Moreover, the present invention provides a lithium secondary battery comprising a positive electrode, a negative electrode and a nonaqueous electrolytic solution which includes an electrolyte salt dissolved in a nonaqueous solvent, the positive electrode including a lithium compound oxide-containing material, the negative electrode including a material which can occlude and release lithium, and the nonaqueous electrolytic solution including a formic ester compound represented by general formulae (I) to (IV) shown above in an amount of 0.01 to 10% by weight of the nonaqueous electrolytic solution.

A lithium secondary battery having excellent battery charactristics such as excellent battery cycling property, electrical capacity and storage property can be obtained using the nonaqueous electrolytic solution of the present invention.

BEST MODE FOR CARRYING OUT THE INVENTION

The inventors of the present invention found that using a nonaqueous electrolytic solution for a lithium secondary battery with a high capacity prepared by adding a specific amount of a formic ester compound having a specific structure thereto can improve the cycling property, which has been a problem to be solved. Although its working effect is unknown, it is thought that a strong coating film is formed on the negative electrode by using the formic ester compound having the specific structure.

Specific embodiments of the present invention will be described below:

[Chemical formula 5]

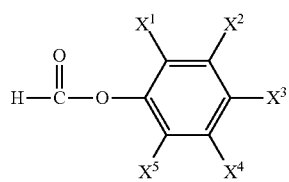

(I)

In the above general formula (I), $X^1$ to $X^5$, are independently a hydrogen atom, a halogen atom, a $C_1$ to $C_6$ linear or branched alkyl group, cyclohexyl group or phenyl group. Examples of the halogen atom include fluorine, chlorine, bromine and iodine, among which fluorine or chlorine atoms are preferable, and a fluorine atom is more preferable. A preferred alkyl group is a $C_1$ to $C_3$ linear or branched alkyl group.

Specific examples of compounds represented by the above general formula (I) include phenyl formate, o-fluorophenyl formate, m-fluorophenyl formate, p-fluorophenyl formate, p-chlorophenyl formate, p-bromophenyl formate, p-iodophenyl formate, pentafluorophenyl formate, pentachlorophenyl formate, pentabromophenyl formate, o-tolyl formate, m-tolyl formate, p-tolyl formate, o-cumenyl formate, m-cumenyl formate, p-cumenyl formate, 4-cyclohexylphenyl formate, biphenyl formate, etc. Among these, phenyl formate, o-fluorophenyl formate, m-fluorophenyl formate, p-fluorophenyl formate, pentafluorophenyl formate, pentachlorophenyl formate, 4-cyclohexylphenyl formate and biphenyl formate are more preferable.

[Chemical formula 6]

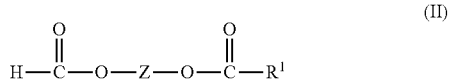

(II)

In the above general formula (II), $R^1$ represents a hydrogen atom, a $C_1$ to $C_{12}$ linear or branched alkyl group, a $C_3$ to $C_8$ cycloalkyl group or a $C_6$ to $C_{12}$ aryl group, and Z is a $C_2$ to $C_{12}$ saturated or unsaturated hydrocarbon group.

Examples of the above $C_1$ to $C_{12}$ alkyl group of $R^1$ include a methyl group, an ethyl group, a propyl group, an isopropyl group, various butyl groups, various pentyl groups, various hexyl groups, various heptyl groups, various octyl groups, etc. Moreover, examples of the $C_3$ to $C_8$ cycloalkyl group include a cyclopropyl group, a cyclopentyl group and a cyclohexyl group, etc. Examples of the $C_6$ to $C_{12}$ aryl group include a phenyl group, a tolyl group, a xylyl group, a naphthyl group, etc.

Z is preferably a linear saturated hydrocarbon group having 2 to 6 methylene chains in the main chain, a saturated hydrocarbon group having 2 to 6 methylene chains in the main chain and at least one $C_1$ to $C_4$ alkyl group as a side chain, an unsaturated hydrocarbon group having a carbon-carbon double bond, or an unsaturated hydrocarbon group having a carbon-carbon triple bond.

Preferable examples of the linear saturated hydrocarbon group having 2 to 6 methylene chains in the main chain include ethylene group, trimethylene group, tetramethylene group, pentamethylene group, hexamethylene group, etc. The saturated hydrocarbon group having 2 to 6 methylene chains in the main chain and at least one $C_1$ to $C_4$ alkyl group as a side chain is preferably that which has a $C_1$ to $C_4$ alkyl group having a linear chain or a branched chain such as isopropyl group and isobutyl group. Examples include methyl ethylene group, ethyl ethylene group, propyl ethylene group, butyl ethylene group, 1-methyl trimethylene group, 2-methyl trimethylene group, 1,1,3-trimethyl trimethylene group, 1-propyl-2-ethyltrimethylene group, 1-methyltetramethylene group, 2-methyltetramethylene group, 1-methyl pentamethylene group, 2-methyl pentamethylene group, 3-methyl pentamethylene group, 1-methyl hexamethylene group, 2-methyl hexamethylene group, 3-methyl hexamethylene group, etc.

Moreover, examples of the unsaturated hydrocarbon group having a carbon-carbon double bond include 2-butenylene group, 1,4-dimethyl-2-butenylene group, etc. Examples of the unsaturated hydrocarbon group having a carbon-carbon triple bond include 2-butynylene group, 2,5-dimethyl-3-hexynylene group, 1,1,4,4-tetramethyl-2-butynylene group, 2,4-hexadiynylene group, 1,1,6,6-tetramethyl-2,4-hexadiynylene group, etc.

Among the compound represented by the above general formula (II), specific examples of the compound in which $R^1$ is a hydrogen atom and Z is a saturated hydrocarbon group compound include ethylene glycol diformate (Z=ethylene group), 1,3-propanediol diformate (Z=trimethylene group), 1,4-butanediol diformate (Z=tetramethylene group), 1,5-pentanediol diformate (Z=pentamethylene group), 1,6-hexanediol diformate (Z=hexamethylene group), 1,2-propanediol diformate (Z=methyl ethylene group), 1,2-butanediol diformate (Z=ethylethylene group), 1,2-pentanediol diformate (Z=propylethylene group), 1,2-hexanediol diformate (Z=butyl ethylene group), 1,3-butanediol diformate (Z=1-methyl trimethylene group), 2-methyl-1,3-propanediol diformate (Z=2-methyl trimethylene group), 1,1,3-trimethyl-1,3-propanediol diformate (Z=1,1,3-trimethyl trimethylene group), 2-ethyl-1-propyl-1,3-propanediol diformate (Z=1-propyl-2-ethyltrimethylene group), 1,4-pentanediol diformate (Z=1-methyltetramethylene group), 2-methyl-1,4-butanediol diformate (Z=2-methyltetramethylene group), 1,3-dimethyl-1,4-butanediol diformate (Z=1,3-dimethyl tetramethylene group), 1,5-hexanediol diformate (Z=1-methylpentamethylene group), 2-methyl-1,4-pentanediol diformate (Z=2-methylpentamethylene group), 2-methyl-1,5pentanediol diformate (Z=2-methylpentamethylene group), 3-methyl-1,5-pentanediol diformate (Z=3-methylpentamethylene group), 1,6-heptanediol diformate (Z=1-methylhexamethylene group), 2-methyl-1,6-hexanediol diformate (Z=2-methylhexamethylene group), 3-methyl-1,6-hexanediol diformate (Z=3-methylhexamethylene group), etc.

Among these, ethylene glycol diformate, 1,3-propanediol diformate, 1,4-butanediol diformate, 1,2-propanediol diformate, 1,3-butanediol diformate, 2-methyl-1,3-propanediol diformate, and 1,1,3-trimethyl-1,3-propanediol diformate are especially preferred.

Among the compounds represented by the above general formula (II), specific examples of the compound in which $R^1$ is a hydrogen atom and Z is an unsaturated hydrocarbon group having a carbon-carbon double bond include 2-butene-1,4-diol diformate (Z=butenylene group), 2-(1,4-dimethyl-2-butene)-1,4-diol diformate (Z=1,4-dimethyl-2-butenylene group), etc.

Moreover, specific examples of the compound in which $R^1$ is a hydrogen atom and Z is an unsaturated hydrocarbon group having a carbon-carbon triple bond include 2-butynel,4-diol diformate (Z=2-butynylene group), 3-hexyne-2,5-diol diformate (Z=1,4-dimethyl-2-butynylene group), 2,5-dimethyl-3-hexyne-2,5-diol diformate (Z=1,1,4,4-tetramethyl-2-butynylene group), 2,4-hexadiyne-1,6-diol diformate (Z=2,4-hexadiynylene group), 1,1,6,6-tetramethyl-2,4-hexadiyne-1,6-diol diformate (Z=1,1,6,6-tetramethyl-2,4-hexadiynylene group), etc.

Among these, 2-butene-1,4-diol diformate, 2-butyne-1,4-diol diformate, 3-hexyne-2, 5-diol diformate, 2,5-dimethyl-3-hexyne-2,5-diol diformate, 2,4-hexadiyne-1,6-diol diformate, and 1,1,6,6-tetramethyl-2,4-hexadiyne-1,6-diol diformate are especially preferred.

Among the compounds represented by the above general formula (II), specific examples of the compound in which $R^1$ is an alkyl group and Z is a saturated hydrocarbon group include ethylene glycol formate acetate (Z=ethylene group), 1,3-propanediol formate acetate (Z=trimethylene group), 1,4-butanediol formate acetate (Z=tetramethylene group), 1,5-pentanediol formate acetate (Z=pentamethylene group), 1,6-hexanediol formate acetate (Z=hexamethylene group), 1,2-propanediol formate acetate (Z=methyl ethylene group), 1,2-butanediol formate acetate (Z=ethylethylene group), 1,2-pentanediol formate acetate (Z=propylethylene group), 1,2-hexanediol formate acetate (Z=butyl ethylene group), 1,3-butanediol formate acetate (Z=1-methyl trimethylene group), 2-methyl-1,3-propanediol formate acetate (Z=2-methyl trimethylene group), 1,1,3-trimethyl-1,3-propanediol formate acetate (Z=1,1,3-trimethyl trimethylene group), 2-ethyl-1-propyl-1,3-propanediol formate acetate (Z=1-propyl-2-ethyltrimethylene group), 1,4-pentanediol formate acetate (Z=1-methyltetramethylene group), 2-methyl-1,4-butanediol formate acetate (Z=2-methyltetramethylene group), 1,3-dimethyl-1,4-butanediol formate acetate (Z=1,3-dimethyl tetramethylene group), 1,5-hexanediol formate acetate (Z=1-methyl pentamethylene group), 2-methyl-1,4-pentanediol formate acetate (Z=2-methyl pentamethylene group), 2-methyl-1,5-pentanediol formate acetate (Z=2-methyl pentamethylene group), 3-methyl-1,5-pentanediol formate acetate (Z=3-methyl pentamethylene group), 1,6-heptane diol formate acetate (Z=1-methyl hexamethylene group), 2-methyl-1,6-hexanediol formate acetate (Z=2-methyl hexamethylene group), 3-methyl-1,6-hexanediol formate acetate (Z=3-methyl hexamethylene group), etc.

Among these, ethylene glycol formate acetate, 1,3-propanediol formate acetate, 1,4-butanediol formate acetate, 1,2-propanediol formate acetate, 1,2-butanediol formate acetate, 1,3-butanediol formate acetate, 2-methyl-1,3-propanediol formate acetate, 1,3-dimethyl-1,4-butanediol formate acetate are especially preferred.

Among the compounds represented by the above general formula (II), specific examples of the compound in which $R^1$ is a cycloalkyl group and Z is an unsaturated hydrocarbon group having a carbon-carbon double bond include 2-butene-1,4-diol formate cyclopropanecarboxylate (Z=butenylene group), 2 (1,4-dimethyl-2-butene)-1,4-diol formate cyclopropanecarboxylate (Z=1,4-dimethyl-2-utenylene group), etc.

Moreover, specific examples of the compound in which $R^1$ is an alkyl group and Z is an unsaturated hydrocarbon group having a carbon-carbon triple bond include 2-butyne-1,4-diol formate acetate (Z=2-butynylene group), 3-hexyne-2,5-diol formate acetate (Z=1,4-dimethyl-2-butynylene group), 2,4-hexadiyne-1,6-diol formate acetate (Z=2,4-hexadiynylene group), 2,5-dimethyl-3-hexyne-2,5-diol formate acetate (Z=1,1,4,4-tetramethyl-2-butynylene group), 1,1,6,6-tetramethyl-2,4-hexadiyne-1,6-diol formate acetate (Z=1,1,6,6-tetramethyl-2,4-hexadiynylene group), etc.

Among these, 2-butyne-1,4-diol formate acetate, 3-hexyne-2,5-diol formate acetate, 2,4-hexadiyne-1,6-diol formate acetate, 2,5-dimethyl-3-hexyne-2,5-diol formate acetate and 1,1,6,6-tetramethyl-2,4-hexadiyne-1,6-diol formate acetate are especially preferred.

Among the compounds represented by the above general formula (II), specific examples of the compound in which $R^1$ is a cycloalkyl group and Z is an unsaturated hydrocarbon group having a carbon-carbon double bond include 2-butene-1,4-diol formate cyclopropanecarboxylate (Z=butenylene group), 2-(1,4-dimethyl-2-butene)-1,4-diol formate cyclopropanecarboxylate (Z=1,4-dimethyl-2-butenylene group), etc.

Moreover, specific examples of the compound in which $R^1$ is a cycloalkyl group and Z is an unsaturated hydrocarbon group having a carbon-carbon triple bond include 2-butyne-1,4-diol formate cyclopropanecarboxylate (Z=2-butynylene group), 2-butyne-1,4-diol formate cyclobutanecarboxylate (Z=2-butynylene group), 3-hexyne-2,5-diol formate cyclopropanecarboxylate (Z=1,4-dimethyl-2-butynylene group), 2,4-hexadiyne-1,6-diol formate cyclopropanecarboxylate (Z=2, 4-hexadiynylene group), 2,5-dimethyl-3-hexyne-2,5-diol formate cyclopropanecarboxylate (Z=1,1,4,4-tetramethyl-2-butynylene group), 1,1,6,6-tetramethyl-2,4-hexadiyne-1,6-diol formate cyclopropanecarboxylate (Z=1,1,6,6-tetramethyl-2,4-hexadiynylene group), etc.

Among these, 2-butyne-1,4-diol formate cyclopropanecarboxylate, 2-butynel,4-diol formate cyclobutanecarboxylate and 3-hexyne-2,5-diol formate cyclopropanecarboxylate are especially preferred.

Among the compounds represented by the above general formula (II), specific examples of the compound in which $R^1$ is an aryl group and Z is an unsaturated hydrocarbon group having a carbon-carbon double bond include 2-butene-1,4-diol formate benzoate (Z=butenylene group), 2-butene-1,4-diol formate benzoate (Z=1,4-dimethyl-2-butenylene group), etc.

Moreover, specific examples of the compound in which $R^1$ is an aryl group and Z is an unsaturated hydrocarbon group having a carbon-carbon triple bond include 2-butynel,4-diol formate benzoate (Z=2-butynylene group), 3-hexyne-2,5-diol formate benzoate (Z=1,4-dimethyl-2-butynylene group), 2,4-hexadiyne-1,6-diol formate benzoate (Z=2,4-hexadiynylene group), 2,5-dimethyl-3-hexyne-2,5-diol formate benzoate (Z=1,1,4,4-tetramethyl-2-butynylene group), 1,1,6,6-tetramethyl-2,4-hexadiyne-1,6-diol formate benzoate (Z=1,1,6,6-tetramethyl-2,4-hexadiynylene group), etc.

Among these, 2-butyne-1,4-diol formate benzoate and 3-hexyne-2,5-diol formate benzoate are especially preferred.

[Chemical formula 7]

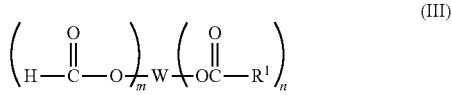

(III)

Among the compounds represented by the above general formula (III), specific examples of the compound in which m=3 and n=0 include trimethylolethane triformate, trimethylolpropane triformate, 1,2,3-propanetriol triformate, 1,2,3-butanetriol triformate, 1,2,4-butanetriol triformate, 1,2,3,4-butanetetrol tetraformate, 1,2,3-pentanetriol triformate, 1,2,3-hexanetriol triformate, 1,2,3-heptanetriol triformate, 1,2,3-octanetriol triformate, 1,2,5-pentanetriol triformate, 1,2,6-hexanetriol triformate, 1,2,7-heptanetriol triformate, 1,2,8-octanetriol triformate, 1,3,5-pentanetriol triformate, 3-methylpentane-1,3,5-triol triformate, 3-ethylpentane-1,3,5-triol triformate, 1,2,3-benzenetriol triformate, 1,2,4-benzenetriol triformate, 1,3,5-benzenetriol triformate and like compounds.

Among these, trimethylolethane triformate, 1,2,3-propanetriol triformate, 1,2,4-butanetriol triformate and 1,2,3,4-butanetetrol tetraformate are especially preferred.

Among the compounds represented by the above general formula (III), specific examples of the compound in which m=2 and n=1 include trimethylolethane diformate acetate, trimethylolpropane diformate acetate, 1,3,5-benzenetriol diformate acetate, trimethylolethane diformate propionate, trimethylolpropane diformate propionate, 1,3,5-benzenetriol diformate propionate, trimethylolethane diformate cyclopropanecarboxylate, trimethylolpropane diformate cyclopropanecarboxylate, 1,3,5-benzenetriol diformate cyclopropanecarboxylate, trimethylolethane diformate cyclobutanecarboxylate, trimethylolpropane diformate cyclobutanecarboxylate, 1,3,5-benzenetriol diformate cyclobutanecarboxylate, trimethylolethane diformate cyclopentanecarboxylate, trimethylolpropane diformate cyclopentanecarboxylate, 1,3,5-benzenetriol diformate cyclopentanecarboxylate, trimethylolethane diformate cyclohexanecarboxylate, trimethylolpropane diformate cyclohexanecarboxylate, 1,3,5-benzenetriol diformate cyclohexanecarboxylate, trimethylolethane diformate benzoate, trimethylolpropane diformate benzoate, 1,3,5-benzenetriol diformate benzoate and like compounds.

Among the compounds represented by the above general formula (III), specific examples of the compound in which m=1 and n=2 include trimethylolethane formate diacetate, trimethylolpropane formate diacetate, 1,3,5-benzenetriol formate diacetate, trimethylolethane formate dipropionate, trimethylolpropane formate dipropionate, 1,3,5-benzenetriol formate dipropionate, trimethylolethane formate di(cyclopropanecarboxylate), trimethylolpropane formate di(cyclopropanecarboxylate), 1,3,5-benzenetriol formate di(cyclopropanecarboxylate), trimethylolethane formate di(cyclobutanecarboxylate), trimethylolpropane formate di(cyclobutanecarboxylate), 1,3,5-benzenetriol formate di(cyclobutanecarboxylate), trimethylolethane formate di(cyclopentanecarboxylate), trimethylolpropane formate di(cyclopentanecarboxylate), 1,3,5-benzenetriol formate di(cyclopentanecarboxylate), trimethylolethane formate di(cyclohexanecarboxylate), trimethylolpropane formate di(cyclohexanecarboxylate), 1,3,5-benzenetriol formate di(cyclohexanecarboxylate), trimethylolethane formate dibenzoate, trimethylolpropane formate dibenzoate, 1,3,5-benzenetriol formate dibenzoate and like compounds.

Among the compounds represented by the above general formula (III), specific examples of the compound in which m=4 and n=0 include 1,2,3,4-butaneteterol tetraformate, 1,2,3,4-pentaerythritol tetraformate, 1,2,3,4-benzenetetraol tetraformate, 1,2,3,5-benzenetetraol tetraformate, 1,2,4,5-benzenetetraol tetraformate and like compounds.

Among the compounds represented by the above general formula (III), specific examples of the compound in which m=3 and n=1 include 1,2,3,4-butanetetrol triformate acetate, 1,2,3,4-pentaerythritol triformate acetate, 1,2,3,4-benzenetetraol triformate acetate, 1,2,3,5-benzenetetraol triformate acetate, 1,2,4,5-benzenetetraol triformate acetate, 1,2,3,4-butanetetrol triformate propionate, 1,2,3,4-pentaerythritol triformate propionate, 1,2,3,4-benzenetetraol triformate propionate, 1,2,3,5-benzenetetraol triformate propionate, 1,2,4,5-benzenetetraol triformate propionate, 1,2,3,4-butanetetrol triformate cyclopropanecarboxylate, 1,2,3,4-pentaerythritol triformate cyclopropanecarboxylate, 1,2,3,4-benzenetetraol triformate cyclopropanecarboxylate, 1,2,3,5-benzenetetraol triformate cyclopropanecarboxylate, 1,2,4,5-benzenetetraol triformate cyclopropanecarboxylate, 1,2,3,4-butanetetrol triformate cyclobutanecarboxylate, 1,2,3,4-pentaerythritol triformate cyclobutanecarboxylate, 1,2,3,4-benzenetetraol triformate cyclobutanecarboxylate, 1,2,3,5-benzenetetraol triformate cyclobutanecarboxylate, 1,2,4,5-benzenetetraol triformate cyclobutanecarboxylate, 1,2,3,4-butanetetrol triformate cyclopentanecarboxylate, 1,2,3,4-pentaerythritol triformate cyclopentanecarboxylate, 1,2,3,4-benzenetetraol triformate cyclopentanecarboxylate, 1,2,3,5-benzenetetraol triformate cyclopentanecarboxylate, 1,2,4,5-benzenetetraol triformate cyclopentanecarboxylate, 1,2,3,4-butanetetrol triformate cyclohexanecarboxylate, 1,2,3,4-pentaerythritol triformate cyclohexanecarboxylate, 1,2,3,4-benzenetetraol triformate cyclohexanecarboxylate, 1,2,3,5-benzenetetraol triformate cyclohexanecarboxylate, 1,2,4,5-benzenetetraol triformate cyclohexanecarboxylate, 1,2,3,4-butanetetrol triformate benzoate, 1,2,3,4-pentaerythritol triformate benzoate, 1,2,3,4-benzenetetraol triformate cyclohexanecarboxybenzoate, 1,2,3,5-benzenetetraol triformate benzoate, 1,2,4,5-benzenetetraol triformate benzoate and like compounds.

Among the compounds represented by the above general formula (III), specific examples of the compound in which m=2 and n=2 include 1,2,3,4-butanetetrol diformate diacetate, 1,2,3,4-pentaerythritol diformate diacetate, 1,2,3,4-benzenetetraol diformate diacetate, 1,2,3,5-benzenetetraol diformate diacetate, 1,2,4,5-benzenetetraol diformate diacetate, 1,2,3,4-butanetetrol diformate dipropionate, 1,2,3,4-pentaerythritol diformate dipropionate, 1,2,3,4-benzenetetraol diformate dipropionate, 1,2,3,5-benzenetetraol diformate dipropionate, 1,2,4,5-benzenetetraol diformate dipropionate, 1,2,3,4-butanetetrol diformate di(cyclopropanecarboxylate), 1,2,3,4-pentaerythritol diformate di(cyclopropanecarboxylate), 1,2,3,4-benzenetetraol diformate di(cyclopropanecarboxylate), 1,2,3,5-benzenetetraol diformate di(cyclopropanecarboxylate), 1,2,4,5-benzenetetraol diformate di(cyclopropanecarboxylate), 1,2,3,4-butanetetrol diformate di(cyclobutanecarboxylate), 1,2,3,4-pentaerythritol diformate di(cyclobutanecarboxylate), 1,2,3,4-benzenetetraol diformate di(cyclobutanecarboxylate), 1,2,3,5-benzenetetraol diformate di(cyclobutanecarboxylate), 1,2,4,5-benzenetetraol diformate di(cyclobutanecarboxylate), 1,2,3,4-butanetetrol diformate di(cyclopentanecarboxylate), 1,2,3,4-pentaerythritol diformate di(cyclopentanecarboxylate), 1,2,3,4-benzenetetraol diformate di(cyclopentanecarboxylate), 1,2,3,5-benzenetetraol diformate di(cyclopentanecarboxylate), 1,2,4,5-benzenetetraol diformate di(cyclopentanecarboxylate), 1,2,3,4-butanetetrol diformate di(cyclohexanecarboxylate), 1,2,3,4-pentaerythritol diformate di(cyclohexanecarboxylate), 1,2,3,4-benzenetetraol diformate di(cyclohexanecarboxylate), 1,2,3,5-benzenetetraol diformate di(cyclohexanecarboxylate), 1,2,4,5-benzenetetraol diformate di(cyclohexanecarboxylate), 1,2,3,4-butanetetrol diformate dibenzoate, 1,2,3,4-pentaerythritol diformate dibenzoate, 1,2,3,4-benzenetetraol diformate dibenzoate, 1,2,3,5-benzenetetraol diformate dibenzoate, 1,2,4,5-benzenetetraol diformate dibenzoate and like compounds.

Among the compounds represented by the above general formula (III), specific examples of the compound in which m=1 and n=3 include 1,2,3,4-butanetetrol formate triacetate, 1,2,3,4-pentaerythritol formate triacetate, 1,2,3,4-benzenetetraol formate triacetate, 1,2,3,5-benzenetetraol formate triacetate, 1,2,4,5-benzenetetraol formate triacetate, 1,2,3,4-butanetetrol formate tripropionate, 1,2,3,4-pentaerythritol formate tripropionate, 1,2,3,4-benzenetetraol formate tripropionate, 1,2,3,5-benzenetetraol formate tripropionate, 1,2,4,5-benzenetetraol formate tripropionate, 1,2,3,4-butanetetrol formate tri(cyclopropanecarboxylate), 1,2,3,4-pentaerythritol formate tri(cyclopropanecarboxylate), 1,2,3,4-benzenetetraol formate tri(cyclopropanecarboxylate), 1,2,3,5-benzenetetraol formate tri(cyclopropanecarboxylate), 1,2,4,5-benzenetetraol formate tri(cyclopropanecarboxylate), 1,2,3,4-butanetetrol formate tri(cyclobutanecarboxylate), 1,2,3,4-pentaerythritol formate tri(cyclobutanecarboxylate), 1,2,3,4-benzenetetraol formate tri(cyclobutanecarboxylate), 1,2,3,5-benzenetetraol formate tri(cyclobutanecarboxylate), 1,2,4,5-benzenetetraol formate tri(cyclobutanecarboxylate), 1,2,3,4-butanetetrol formate tri(cyclopentanecarboxylate), 1,2,3,4-pentaerythritol formate tri(cyclopentanecarboxylate), 1,2,3,4-benzenetetraol formate tri(cyclopentanecarboxylate), 1,2,3,5-benzenetetraol formate tri(cyclopentanecarboxylate), 1,2,4,5-benzenetetraol formate tri(cyclopentanecarboxylate), 1,2,3,4-butanetetrol formate tri(cyclohexanecarboxylate), 1,2,3,4-pentaerythritol formate tri(cyclohexanecarboxylate), 1,2,3,4-benzenetetraol formate tri(cyclohexanecarboxylate), 1,2,3,5-benzenetetraol formate tri(cyclohexanecarboxylate), 1,2,4,5-benzenetetraol formate tri(cyclohexanecarboxylate), 1,2,3,4-butanetetrol formate tribenzoate, 1,2,3,4-pentaerythritol formate tribenzoate, 1,2,3,4-benzenetetraol formate tribenzoate, 1,2,3,5-benzenetetraol formate tribenzoate, 1,2,4,5-benzenetetraol formate tribenzoate and like compounds.

[Chemical formula 8]

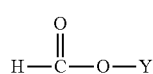

(IV)

(Y represents a $C_4$ to $C_{20}$ linear or branched alkyl group, a $C_2$ to $C_{20}$ linear or branched alkenyl group or a $C_2$ to $C_{20}$ linear or branched alkynyl group.)

Specific examples of the formic ester compound represented by the above general formula (IV) include compounds represented by the general formulae (V) to (VIII) shown below.

[Chemical formula 9]

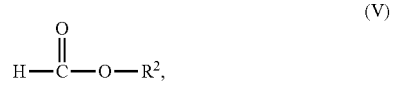

(V)

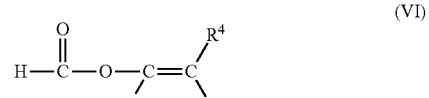

(VI)

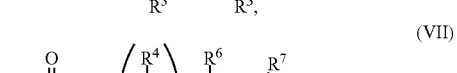

(VII)

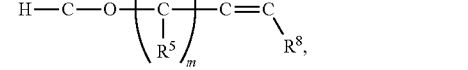

(VIII)

(where $R^2$ represents a $C_4$ to $C_{20}$ linear or branched alkyl group; $R^3$ to $R^5$ independently represents a hydrogen atom or a $C_1$ to $C_8$ alkyl group; $R^7$ to $R^9$ independently represents a $C_1$ to $C_{20}$ linear or branched alkyl group, a $C_1$ to $C_{20}$ linear t or branched alkenyl group or a $C_1$ to $C_{20}$ linear or branched alkynyl group; m represents an integer of 0 to 10; and n represents an integer of 1 to 10.)

Examples of the linear alkyl group of $R^2$ mentioned above include a $C_4$ to $C_{20}$, preferably $C_5$ to $C_{15}$, more preferably $C_6$ to $C_{12}$ hexyl group, heptyl group, octyl group, etc. Examples of the branched alkyl group include those having $C_5$ to $C_{12}$ methylene chains in the main chain and at least one $C_1$ to $C_4$ linear or branched alkyl group such as isopropyl group and isobutyl group as a side chain. Specific examples include 1-methyl pentyl group, 1-methyl hexyl group, 1-methyl heptyl group, 1-ethyl hexyl group, 1-methyl-4-butyl group, 4-methyl pentyl group, 1,1-dimethyl pentyl group, etc.

The alkyl groups of $R^3$ to $R^5$ mentioned above are $C_1$ to $C_8$ alkyl groups. Examples include methyl group, ethyl group, propyl group, and the $C_4$ to $C_8$ groups of the specific examples of $R^2$ mentioned above.

The alkyl groups of $R^7$ to $R^9$ mentioned above are $C_1$ to $C_{20}$, preferably $C_4$ to $C_{15}$ alkyl groups. Examples include methyl group, ethyl group, propyl group, and the $C_4$ to $C_{20}$ groups of the specific examples of $R^2$ mentioned above.

The alkenyl groups of $R^7$ to $R^9$ mentioned above are $C_1$ to $C_{20}$, preferably $C_2$ to $C_{12}$ alkenyl groups. Examples include vinyl group, allyl group, crotyl group, etc.

The alkynyl groups of $R^7$ to $R^9$ mentioned above are $C_1$ to $C_{20}$, preferably $C_2$ to $C_{12}$ alkynyl groups. Examples include ethynyl group, 2-propynyl group, 3-butynyl group, 1-methyl-2-propynyl group, etc.

Specific examples of the compound represented by the above general formula (V) include butyl formate, pentyl formate, hexyl formate, heptyl formate, octyl formate, decyl formate, isobutyl formate, 1-methylpentyl formate, 1-methylhexyl formate, 1-methylheptyl formate, 1-ethylhexyl formate, 1-methyl-4-butyl formate, 4-methylpentyl formate, 1,1-dimethylpentyl formate, etc.

Among these, pentyl formate, hexyl formate, heptyl formate, octyl formate and decyl formate are especially preferable.

[Chemical formula 10]

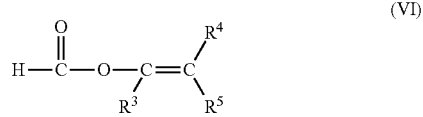

(VI)

Specific examples of the compound represented by the above general formula (VI) include vinyl formate, isopropenyl formate, etc.

[Chemical formula 11]

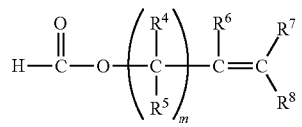

(VII)

Specific examples of the compound represented by the above general formula (VII) include allyl formate, 1-propenyl formate, 2-methyl-1-propenyl formate, 2-methylallyl formate etc.

[Chemical formula 12]

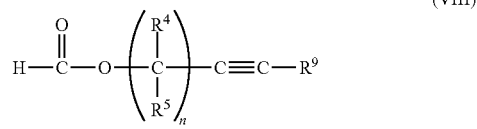

(VIII)

Specific examples of the compound represented by the above formula (VIII) include ethynyl formate, 1-propynyl formate, 2-propynyl formate, 1-butynyl formate, 2-butynyl formate, 3-butynyl formate, 2-pentynyl formate, 1-methyl-2-propynyl formate, 1-dimethyl-2-butynyl formate, 1, 1-dimethyl-2-propynyl formate, 1, 1-diethyl-2-propynyl formate, 1-ethyl-1-methyl-2-propynyl formate, 1-isobutyl-1-methyl-2-propynyl formate, 1-dimethyl-2-butynyl formate, 1-ethynylcyclohexyl formate, 1-methyl-1-phenyl-2-propynyl formate, 1, 1-diphenyl-2-propynyl formate, etc.

Among the formic ester compounds represented by the above formulae (VI) to (VIII), vinyl formate, allyl formate, propynyl formate, butynyl formate, 2-pentynyl formate, 1-methyl-2-propynyl formate, 1-methyl-2-butynyl formate, 1, 1-dimethyl-2-propynyl formate, 1,1-diethyl-2-propynyl formate and 1-ethyl-1-methyl-2-propynyl formate are especially preferred.

In the above formic ester compounds, if the contained amount of a formic ester compound represented by formulae (I) to (IV) shown above is too high, the conductivity of the electrolytic solution may change and the battery performance may be thus lowered. Therefore, the amount is not more than 10%, particularly preferably not more than 5%, and most preferably not more than 3% by weight of the nonaqueous electrolytic solution. On the other hand, if the amount is too low, a sufficient coating film is not formed and expected battery characteristics maynot be obtained. Therefore, the amount is not less than 0.01%, particularly preferably not less than 0.05%, and most preferably not less than 0.1% by weight of the nonaqueous electrolytic solution.

Examples of the nonaqueous solvent for use in the present invention include ethylene carbonate (EC), propylene carbonate (PC), butylene carbonate, fluoroethylene carbonate (FEC), vinylene carbonate (VC), dimethylvinylene carbonate, vinylethylene carbonate and like cyclic carbonates, γ-butyrolactone (GBL), γ-valerolactone, α-angelicalactone and like lactones, dimethyl carbonate (DMC), methyl ethyl carbonate (MEC), diethyl carbonate (DEC), methyl propyl carbonate, dipropyl carbonate, methyl butyl carbonate, dibutyl carbonate and like linear carbonates, tetrahydrofuran, 2-methyltetrahydrofuran, 1,4-dioxane, 1,2-dimethoxyethane, 1,2-diethoxyethane, 1,2-dibutoxyethane and like ethers, acetonitrile, adiponitrile and like nitriles, trimethyl phosphate, trioctyl phosphate and like phosphoric acid esters, methyl propionate, methyl pivalate, butyl pivalate, hexyl pivalate, octyl pivalate, dimethyl oxalate, ethyl methyl oxalate, diethyl oxalate and like linear esters, dimethyl formamide and like amides, 1,3-propanesultone, 1,4-propanesultone, divinyl sulfone, 1,4-butanediol dimethane sulfonate, glycol sulfite, propylene sulfite, glycol sulfate, propylene sulfate and like S=O containing compounds.

These nonaqueous solvents are normally used in combination to achieve appropriate properties. Examples of the combination include combinations of a cyclic carbonate and a linear carbonate, combinations of a cyclic carbonate and a lactone, combinations of a lactone and a linear ester, combinations of a cyclic carbonate and a lactone and a linear ester, combinations of a cyclic carbonate and a linear carbonate and a lactone, combinations of a cyclic carbonate and an ether, combinations of a cyclic carbonate and a linear carbonate and an ether, combinations of a cyclic carbonate and a linear carbonate and a linear ester and various other combinations. Their combination ratio is not particularly limited.

Among these, the volumetric ratio of a cyclic carbonate to a chain carbonate is preferably 20:80 to 40:60, and particularly preferably 25:75 to 35:65.

Among the cyclic carbonates mentioned above, it is preferable to use at least two members selected from ethylene carbonate (EC), propylene carbonate (PC), fluoroethylene carbonate (FEC), vinylene carbonate (VC) and vinylethylene carbonate. In particular, it is most preferable that at least two members selected from ethylene carbonate (EC), propylene carbonate (PC), fluoroethylene carbonate (FEC) and vinylene carbonate (VC) are contained. Moreover, when two or more cyclic carbonates are used, the total amount of the cyclic carbonates, excluding the volume of the cyclic carbonate contained in the highest amount, is preferably 0.05 to 15%, and more preferably 0.1 to 10% by volume of the nonaqueous solvent.

Moreover, among the above-mentioned linear carbonates, it is preferable to use asymmetrical carbonates such as methyl ethyl carbonate (MEC), methyl propyl carbonate, methyl butyl carbonate and like. In particular, it is preferable to use methyl ethyl carbonate (MEC) which is liquid at low temperatures and has low evaporation due to its relatively high boiling point.

Moreover, among the linear carbonates, the volumetric ratio by volume of methyl ethyl carbonate (MEC) which is an asymmetrical chain carbonate to dimethyl carbonate (DMC) and/or diethyl carbonate (DEC) which is/are a symmetrical linear carbonate is preferably 100/0 to 51/49, and more preferably 100/0 to 70/30.

Moreover, the combinations using lactones among said combinations preferably have such ratios that the volumetric ratios of the lactones become the highest.

For example, the volumetric ratio of a carbonate and a lactone is preferably 10:90 to 40:60, and particularly preferably 20:80 to 35:65.

Examples of electrolyte salts for use in the present invention include lithium salts such as $LiPF_6$, $LiBF_4$ and $LiClO_4$, lithium salts containing a alkyl group, such as $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso\text{-}C_3F_7)_3$, and $LiPF_5(iso\text{-}C_3F_7)$, and lithium salts containing a cyclic alkylene group such as $(CF_2)_2(SO_2)_2NLi$ and $(CF_2)_3(SO_2)_2NLi$.

Among these, especially preferable electrolyte salts are $LiPF_6$, $LiBF_4$, $LiN(SO_2CF_3)_2$, and the most preferable electrolyte salt is $LiPF_6$. These electrolyte salts may be used singly or in combination of two or more kinds.

Examples of preferable combinations of these electrolyte salts include the combination of $LiPF_6$ and $LiBF_4$, the combination of $LiPF_6$ and $LiN(SO_2CF_3)_2$, the combination of $LiBF_4$ and $LiN(SO_2CF_3)_2$ and other combinations. The combination of $LiPF_6$ and $LiBF_4$ is particularly preferable.

Electrolyte salts may be mixed at any ratio. When electrolyte salts are used in combination with $LiPF_6$, the amount (molar ratio) of the electrolyte salts in all the electrolyte salts is preferably 0.01 to 45%, more preferably 0.03 to 20%, even more preferably 0.05 to 10%, and the most preferably 0.05 to 5%.

Moreover, all the electrolyte salts can be used by dissolving in said nonaqueous solvent in a concentration of normally 0.5 to 3 M, preferably 0.7 to 2.0 M, more preferably 0.8 to 1.6 M, and the most preferably 0.8 to 1.2 M.

The electrolytic solution of the present invention can be obtained by, for example, mixing nonaqueous solvents such as ethylene carbonate (EC), propylene carbonate (PC) and methyl ethyl carbonate (MEC), as described above, dissolving the electrolyte salt described above in this mixture, and then dissolving formic ester compounds represented by general formulae (I) to (IV) shown above in this solution.

For example, air or carbon dioxide can be contained in the nonaqueous electrolytic solution of the present invention to prevent gas production due to decomposition of the electrolytic solution and improve battery performances such as cycling property, storage property and the like.

A method of incorporating (dissolving) carbon dioxide or air in the nonaqueous electrolytic solution may be either of the followings: (1) a method of preliminarily causing a nonaqueous electrolytic solution to contact with air or carbon dioxide-containing gas before the nonaqueous electrolytic solution is poured into a battery, and (2) trapping air- or carbon dioxide-containing gas into a battery after the nonaqueous electrolytic solution is poured into the battery and before or after the battery is sealed. Alternatively, these methods can be used in combination. It is preferable that the air- or carbon dioxide-containing gas contains as little moisture as possible and has a dew point of −40° C. or lower, and it is especially preferable that it has a dew point of −50° C. or lower.

The nonaqueous electrolytic solution of the present invention is used as a component of a secondary battery, in particular of a lithium secondary battery. Components constituting a secondary battery other than the nonaqueous electrolytic solution are not particularly limited, and various components used conventionally can be used.

For example, a lithium compound metal oxide containing cobalt, manganese or nickel is used as a positive electrode active material. Only one of these positive electrode active materials may be used selectively, or they may be used in combination of two or more kinds. Examples of such a compound metal oxide include $LiCoO_2$, $LiMn_2O_4$, $LiNiO_2$, $LiCo_{1-x}Ni_xO_2$ ($0.01 < x < 1$), etc. Moreover, they may be used in appropriate combinations such as $LiCoO_2$ and $LiMn_2O_4$, $LiCoO_2$ and $LiNiO_2$, $LiMn_2O_4$ and $LiNiO_2$.

Among these, lithium compound oxides which are usable with the charge potential of the positive electrode in a fully charged state relative to lithium of 4.3 V or higher such as $LiCoO_2$, $LiMn_2O_4$ and $LiNiO_2$ are preferable, and lithium compound oxides which are usable at 4.4 V or higher such as $LiCo_{1/3}Ni_{1/3}Mn_{1/3}O_2$, $LiNi_{1/2}Mn_{3/2}O_4$ are more preferable. Moreover, the lithium compound metal oxides may be partially replaced with other elements. For example, $LiCoO_2$ may be partially replaced with Sn, Mg, Fe, Ti, Al, Zr, Cr, V, Ga, Zn, Cu, etc.

A conductive material of the positive electrode is not particularly limited as long as it is an electronic conductive material which does not undergo chemical change. Such a conductive material includes graphites such as natural graphite (scaly graphite, etc.) and artificial graphite; and carbon blacks such as acetylene black, ketchen black, channel black, furnace black, lamp black and thermal black. Moreover, graphites and carbon blacks may be suitably mixed before use.

The amount of a positive electrode mixture added to the conductive material is preferably 1 to 10% by weight, and especially preferably 2 to 5% by weight.

The positive electrode is produced by kneading the positive electrode active material described above, together with conductive materials such as acetylene black and carbon black and binders such as polytetrafluoroethylene (PTFE), polyvinylidene fluoride (PVDF), copolymer of styrene and butadiene (SBR), copolymer of acrylonitrile and butadiene (NBR), carboxymethylcellulose (CMC) to prepare a positive electrode mixture, rolling this positive electrode material onto a lath board made of aluminium foil or stainless steel as a collector, and then heating it at a temperature of about 50° C. to 250° C. for about 2 hours in vacuo.

A material which can occlude and release lithium is used for the negative electrode (negative electrode active material). For example, lithium metal, lithium alloy, and carbon materials [pyrolytic carbons, cokes, graphites (artificial graphites, natural graphites, etc.), organic high molecular compound combustion bodies, carbon fibers], tin, tin compounds, silicon and silicon compounds are used. Part or all of carbon materials may be replaced with tin, tin compounds, silicon or silicon compounds so that the battery capacity can be increased.

Among these, carbon materials are preferable, and graphites having a graphite-type crystalline structure in which the spacing ($d_{002}$) of lattice planes (002) is 0.340 nm or less, in particular 0.335 to 0.340 nm are more preferably used. Only one of these negative electrodes (negative electrode active materials) may be used selectively or they may be used in combination of two or more kinds.

It should be noted that powder materials such as carbon materials are kneaded together with ethylene-propylene-diene terpolymer (EPDM), polytetrafluoroethylene (PTFE), polyvinylidene fluoride (PVDF), copolymers of styrene and butadiene (SBR), copolymers of acrylonitrile and butadiene (NBR), carboxymethylcellulose (CMC) and like binders and used as negative electrode mixtures. A method of producing the negative electrode is not particularly limited, and can be produced by a method similar to that of the positive electrode described above.

The structure of the lithium secondary battery is not particularly limited. Examples include coin-shaped batteries having a positive electrode, a negative electrode, a single-layer or multi-layer separator, and an electrolytic solution; cylindrical batteries, square-shaped batteries and laminated batteries having a positive electrode, a negative electrode and a rolled separator, among others. Known materials such as microporous films, woven fabrics, nonwoven fabrics of polypropylene, polyethylene and other polyolefins are used as separators. Moreover, a separator for batteries may have a single-layer porous film or laminated porous film constitution.

A separator for batteries for use in the present invention has an air permeability of preferably 50 to 1000 sec/100 cc, more preferably 100 to 800 sec/100 cc, and the most preferably 300 to 500 sec/100 cc, although it may vary depending on the manufacturing conditions. If the air permeability is too high, lithium ion conductivity is lowered and therefore the function as a separator for batteries is insufficient, and if it is too low, the mechanical strength is lowered. Therefore, the air permeability is preferably within the above-mentioned range. Moreover, its porosity is preferably 30 to 60%, more preferably 35 to 55%, and the most preferably 40 to 50%. In particular, setting the porosity to fall within this range is preferable since the capacity characteristic of the battery is improved. Furthermore, it is preferable that the thickness of the separator for batteries is as thin as possible because the energy density can be increased. However, in terms of both the mechanical strength and performance, it is preferably 5 to 50 μm, more preferably 10 to 40 μm, and the most preferably 15 to 25 μm.

In the present invention, in order to increase the additive effect of a formic ester compound represented by general formula (I) to (IV), it is preferable to adjust the density of electrode material layers. In particular, the density of the positive electrode mixture layer formed on an aluminium foil is preferably 3.2 to 4.0 g/cm$^3$, more preferably 3.3 to 3.9 g/cm$^3$, and the most preferably 3.4 to 3.8 g/cm$^3$. If the density of the positive electrode mixture is higher than 4.0 g/cm$^3$, its preparation may become practically difficult. Meanwhile, the density of the negative electrode mixture layer formed on a copper foil is 1.3 to 2.0 g/cm$^3$, more preferably 1.4 to 1.9 g/cm$^3$, and the most preferably 1.5 to 1.8 g/cm$^3$. If the density of the negative electrode mixture layer is higher than 2.0 g/cm$^3$, its preparation may become practically difficult.

Moreover, the thickness of the electrode layer of the suitable positive electrode in the present invention (per one side of the collector) is 30 to 120 μm, and preferably 50 to 100 μm, while the thickness of the electrode layer of the negative electrode (per one side of the collector) is 1 to 100 μm, and preferably 3 to 70 μm. If the thickness of the electrode material layer is below the suitable range, the amount of the active material in the electrode material layer is decreased and thus the battery capacity is lowered. On the other hand, if the thickness is above the range, the cycling property and rate characteristic are undesirably lowered.

The lithium secondary battery in the present invention has an excellent cycling property for a long period even when its end-of-charge voltage is higher than 4.2 V, and in particular, it has an excellent cycling property when the end-of-charge voltage is higher than 4.3 V. The end-of-discharge voltage may be 2.5 V or higher, and further 2.8 V or higher. The current value is not particularly limited, but it is normally used at a constant current discharge of 0.1 to 3 C. Moreover, the lithium secondary battery in the present invention can be charged and discharged at −40° C. or higher, but the temperature is preferably 0° C. or higher. Moreover, it can be charged and discharged at 100° C. or lower, but the temperature is preferably 80° C. or lower.

In the present invention, as a measure against an increased internal pressure of the lithium secondary battery, a safety valve can be used on a sealing plate. A method of making a cut in battery cans, gaskets and other materials can be also used. In addition, various conventionally known safety elements (as overcurrent protection elements, at least one of fuses, bimetals and PTC elements) are preferably provided.

In the present invention, a plurality of the lithium secondary batteries are optionally arranged serially and/or in parallel and accommodated in a battery pack. The battery pack may be provided with safety elements such as PTC element, temperature fuse, fuse and/or current breaking element, as well as a safety circuit (a circuit having a function of monitoring the voltage, temperature and current of each battery and/or the entire battery pack and shutting off the current).

EXAMPLE

The present invention will be more specifically described below with reference to Examples and Comparative Examples. It should be noted that the present invention is not limited to these Examples and that various combinations which can be readily presumed from the purport of the invention are possible. In particular, the combinations of solvents of Examples described below are not limited.

Example 1

[Preparation of Nonaqueous Electrolytic Solution]

A nonaqueous solvent of ethylene carbonate (EC):propylene carbonate (PC):methyl ethyl carbonate (MEC) (volumetric ratio)=30:5:65 was prepared. A nonaqueous electrolytic solution was prepared by dissolving LiPF$_6$ in this solvent as an electrolyte salt to give a concentration of 1 M, and then 2-butyne-1,4-diol diformate was further added to the electrolytic solution in an amount of 0.1% by weight of the nonaqueous electrolytic solution.

[Production of Lithium Secondary Battery and Measurement of Battery Characteristics]

Ninety-four % by weight of LiCoO$_2$ (positive electrode active material), 3% by weight of acetylene black (conductive material) and 3% by weight of polyvinylidene fluoride (binder) were mixed. A 1-methyl-2-pyrrolidone solvent was added to this mixture and mixed. The resulting mixture was applied on an aluminium foil, dried, pressure-molded and heated, preparing a positive electrode. 95% by weight of an artificial graphite (negative electrode active material) in which the spacing ($d_{002}$) between lattice planes (002) was 0.335 nm and which has a graphite-type crystalline structure was mixed with 5% by weight of polyvinylidene fluoride (binder) were mixed. A 1-methyl-2-pyrrolidone solvent was added to this mixture. The resulting mixture was applied on a copper foil, dried, pressure-molded and heated, preparing a negative electrode. A cylindrical battery of 18650 size (diameter: 18 mm, height: 65 mm) was prepared by using a separator (thickness: 20 μm) of a polyethylene microporous film, pouring the nonaqueous electrolytic solution mentioned above and then trapping air having a dew point of −60° C. in the battery before the battery was sealed. The battery was provided with a pressure release vent and an internal current breaker (PTC element). At this time, the electrode density of the positive electrode was 3.5 g/cm$^3$, while that of the negative electrode was 1.6 g/cm$^3$. The thickness (per one side of the collector) of the positive electrode layer was 70 μm, while that of the negative electrode layer (per one side of the collector) was 60 μm.

This 18650 battery was charged to 4.2 V at 25° C. at a constant current of 2.2 A (1 C), and was then charged at a constant voltage for the total of 3 hours with the terminal voltage of 4.2 V. Subsequently, the battery was discharged to the terminal voltage of 3.0 V at a constant current of 2.2 A (1 C). These charging and discharging were repeated. An initial discharge capacity (mAh) was almost equal to that of when using 1 M LiPF$_6$-EC/PC/MEC (volumetric ratio=30/5/65) with no formic ester compound added as a nonaqueous electrolytic solution (Comparative Example 1). The battery characteristics determined after conducting 200 cycles showed that the discharge capacity retention, when the initial discharge capacity was 100%, was 84.7%. Conditions for preparing a 18650 battery and its battery characteristics are shown in Table 1.

Examples 2 to 4

Nonaqueous electrolytic solutions were prepared, cylindrical batteries of 18650 size were produced and the cycle of charging and discharging was repeated in a manner similar to Example 1 except that 2-butyne-1,4-diol diformate was used as an additive in an amount of 0.5% by weight, 1% by weight and 5% by weight, respectively, of the nonaqueous electrolytic solution. The results are shown in Table 1.

Examples 5 to 14

Nonaqueous electrolytic solutions were prepared, cylindrical batteries of 18650 size were produced and the cycle of charging and discharging was repeated in a manner similar to Example 1 except that phenyl formate, biphenyl formate, 4-cyclohexylphenyl formate, pentafluorophenyl formate, ethylene glycol diformate, ethylene glycol formate acetate, 2-butene-1,4-diol diformate, 2,5-dimethyl-3-hexyne-2,5-diol diformate, 2,4-hexadiyne-1,6-diol diformate and trimethylolethane triformate were used as additives in an amount of 1% by weight of each of the nonaqueous electrolytic solution. The results are shown in Table 1.

Example 15

A nonaqueous electrolytic solution was prepared, a cylindrical battery of 18650 size was produced and the cycle of charging and discharging was repeated in a manner similar to Example 3 except that LiMn$_2$O$_4$ was used instead of LiCoO$_2$ as the positive electrode (positive electrode active material). The results are shown in Table 1.

Comparative Example 1

A nonaqueous electrolytic solution was prepared, a cylindrical battery of 18650 size was produced and the cycle of charging and discharging was repeated in a manner similar to Example 1 except that no additives were used. The results are shown in Table 1.

Comparative Example 2

A nonaqueous electrolytic solution was prepared, a cylindrical battery of 18650 size was produced and the cycle of charging and discharging was repeated in a manner similar to Example 1 except that 2-butyne-1,4-diol diacetate was used as an additive in an amount of 1% by weight of the nonaqueous electrolytic solution. The results are shown in Table 1.

TABLE 1

| | | Positive electrode | Compound | Amount added wt % | Composition of electrolytic solution (volumetric ratio) | Initial discharge capacity (relative value) | Retention of discharge capacity after 200 cycles (%) |
|---|---|---|---|---|---|---|---|
| Example | 1 | LiCoO$_2$ | 2-Butyne-1,4-diol diformate | 0.1 | 1 M LiPF$_6$ EC/PC/MEC = 30/5/65 | 1.00 | 84.7 |
| | 2 | LiCoO$_2$ | 2-Butyne-1,4-diol diformate | 0.5 | 1 M LiPF$_6$ EC/PC/MEC = 30/5/65 | 1.00 | 85.4 |
| | 3 | LiCoO$_2$ | 2-Butyne-1,4-diol diformate | 1 | 1 M LiPF$_6$ EC/PC/MEC = 30/5/65 | 1.00 | 86.1 |
| | 4 | LiCoO$_2$ | 2-Butyne-1,4-diol diformate | 5 | 1 M LiPF$_6$ EC/PC/MEC = 30/5/65 | 1.00 | 85.4 |
| | 5 | LiCoO$_2$ | Phenyl formate | 1 | 1 M LiPF$_6$ EC/PC/MEC = 30/5/65 | 1.00 | 81.5 |
| | 6 | LiCoO$_2$ | Biphenyl formate | 1 | 1 M LiPF$_6$ EC/PC/MEC = 30/5/65 | 1.00 | 82.1 |
| | 7 | LiCoO$_2$ | 4-Cyclohexylphenyl formate | 1 | 1 M LiPF$_6$ EC/PC/MEC = 30/5/65 | 1.00 | 84.1 |
| | 8 | LiCoO$_2$ | Pentafluorophenyl formate | 1 | 1 M LiPF$_6$ EC/PC/MEC = 30/5/65 | 1.00 | 84.8 |
| | 9 | LiCoO$_2$ | Ethylene glycol diformate | 1 | 1 M LiPF$_6$ EC/PC/MEC = 30/5/65 | 1.00 | 85.6 |
| | 10 | LiCoO$_2$ | Ethylene glycol formate acetate | 1 | 1 M LiPF$_6$ EC/PC/MEC = 30/5/65 | 1.00 | 84.2 |
| | 11 | LiCoO$_2$ | 2-Butene-1,4-diol diformate | 1 | 1 M LiPF$_6$ EC/PC/MEC = 30/5/65 | 1.00 | 82.0 |
| | 12 | LiCoO$_2$ | 2,5-Dimethyl-3-hexyne-2.5-diol diformate | 1 | 1 M LiPF$_6$ EC/PC/MEC = 30/5/65 | 1.00 | 84.9 |
| | 13 | LiCoO$_2$ | 2,4-Hexadiyne-1,6-diol diformate | 1 | 1 M LiPF$_6$ EC/PC/MEC = 30/5/65 | 1.00 | 84.0 |

TABLE 1-continued

Table 1

| | | Positive electrode | Compound | Amount added wt % | Composition of electrolytic solution (volumetric ratio) | Initial discharge capacity (relative value) | Retention of discharge capacity after 200 cycles (%) |
|---|---|---|---|---|---|---|---|
| | 14 | LiCoO$_2$ | Trimethylolethane triformate | 1 | 1 M LiPF$_6$ EC/PC/MEC = 30/5/65 | 1.00 | 82.3 |
| | 15 | LiMn$_2$O$_4$ | 2-Butyne-1,4-diol diformate | 1 | 1 M LiPF$_6$ EC/PC/MEC = 30/5/65 | 0.89 | 83.7 |
| Comp. Example | 1 | LiCoO$_2$ | None | 0 | 1 M LiPF$_6$ EC/PC/MEC = 30/5/65 | 1.00 | 71.6 |
| | 2 | LiCoO$_2$ | 2-Butyne-1,4-diol diacetate | 1 | 1 M LiPF$_6$ EC/PC/MEC = 30/5/65 | 1.00 | 73.7 |

Example 16

[Preparation of Nonaqueous Electrolytic Solution]

A nonaqueous solvent of ethylene carbonate (EC):vinylene carbonate (VC):γ-butyrolactone (GBL) (volumetric ratio)=20:2:78 was prepared. LiPF$_6$ and LiBF$_4$ were dissolved in this solvent as electrolyte salts to give concentrations of 0.9 M and 0.1 M, respectively, to prepare a nonaqueous electrolytic solution, and then pentyl formate was further added to the electrolytic solution in an amount of 1% by weight of the nonaqueous electrolytic solution.

[Production of the Lithium Secondary Battery and Measurement of Battery Characteristics]

Ninety % by weight of LiCoO$_2$ (positive electrode active material), 5% by weight of acetylene black (conductive material) and 5% by weight of polyvinylidene fluoride (binder) were mixed. A 1-methyl-2-pyrrolidone solvent was added to this mixture and mixed. The resulting mixture was applied on an aluminium foil, dried, pressure-molded and heated, preparing a positive electrode. 95% by weight of an artificial graphite (negative electrode active material) in which the spacing (d$_{002}$) of lattice planes (002) were 0.336 nm and which has a graphite-type crystalline structure and 5% by weight of polyvinylidene fluoride (binder) were mixed. A 1-methyl-2-pyrrolidone solvent was added to this mixture. The resulting mixture was applied on a copper foil, dried, pressure-molded and heated, preparing a negative electrode. A cylindrical battery of 18650 size (diameter: 18 mm, height: 65 mm) was prepared by using a separator of a polypropylene microporous film, pouring the nonaqueous electrolytic solution mentioned above and then trapping carbon dioxide having a dew point of −60° C. in the battery before the battery was sealed. The battery was provided with a pressure release vent and an internal current breaker (PTC element). At this time, the electrode density of the positive electrode was 3.4 g/cm$^3$, while that of the negative electrode was 1.4 g/cm$^3$. The thickness (per one side of the collector) of the positive electrode layer was 70 μm, while that of the negative electrode layer (per one side of the collector) was 75 μm.

This 18650 battery was charged to 4.2 V at room temperature (25° C.) at a constant current of 0.6 A (0.3 C), and was then charged for the total of 6 hours at a constant voltage with the terminal voltage of 4.2 V. Subsequently, the battery was discharged to a terminal voltage of 2.8 V at a constant current of 0.6 A (0.3 C). These charging and discharging were repeated. The initial discharge capacity (mAh) was almost equal to that of when 1 M LiPF$_6$-EC/VC/GBL (volumetric ratio=20/2/78) with no formic ester compound added was used as a nonaqueous electrolytic solution (Comparative Example 3), The battery characteristics determined after conducting 200 cycles showed that the discharge capacity retention, when the initial discharge capacity was 100%, was 77.1%. Conditions for preparing the 18650 battery and its battery characteristics are shown in Table 2.

Example 17

A nonaqueous electrolytic solution was prepared, a cylindrical battery of 18650 size was produced and the cycle of charging and discharging was repeated in a manner similar to Example 16 except that hexyl formate was used as an additive in an amount of 1% by weight of the nonaqueous electrolytic solution. The results are shown in Table 2.

Examples 18 to 20

Nonaqueous electrolytic solutions were prepared, cylindrical batteries of 18650 size were produced and the cycle of charging and discharging was repeated in a manner similar to Example 16 except that octyl formate was used as an additive in an amount of 0.1% by weight, 1% by weight and 5% by weight, respectively, of the nonaqueous electrolytic solution. The results are shown in Table 2.

Example 21

A nonaqueous electrolytic solution was prepared, a cylindrical battery of 18650 size was produced and the cycle of charging and discharging was repeated in a manner similar to Example 16 except that decyl formate was used as an additive in an amount of 0.5% by weight of the nonaqueous electrolytic solution. The results are shown in Table 2.

Comparative Example 3

A nonaqueous electrolytic solution was prepared, a cylindrical battery of 18650 size was produced and the cycle of charging and discharging was repeated in a manner similar to Example 16 except that no additives were used. The results are shown in Table 2.

Comparative Example 4

A nonaqueous electrolytic solution was prepared, a cylindrical battery of 18650 size was produced and the cycle of charging and discharging was repeated in a manner similar to Example 16 except that ethyl formate was used as an additive in an amount of 1% by weight of the nonaqueous electrolytic solution. The results are shown in Table 2.

TABLE 2

Table 2

| | | Positive electrode | Compound | Amount added wt % | Composition of electrolytic solution (volumetric ratio) | Initial discharge capacity (relative value) | Retention of discharge capacity after 200 cycles (%) |
|---|---|---|---|---|---|---|---|
| Example | 16 | LiCoO$_2$ | Pentyl formate | 1 | 1 M (LiPF$_6$/LiBF$_4$ = 9/1) EC/VC/GBL = 20/2/78 | 1.00 | 77.1 |
| | 17 | LiCoO$_2$ | Hexyl formate | 1 | 1 M (LiPF$_6$/LiBF$_4$ = 9/1) EC/VC/GBL = 20/2/78 | 1.00 | 84.3 |
| | 18 | LiCoO$_2$ | Octyl formate | 0.1 | 1 M (LiPF$_6$/LiBF$_4$ = 9/1) EC/VC/GBL = 20/2/78 | 1.00 | 82.5 |
| | 19 | LiCoO$_2$ | Octyl formate | 1 | 1 M (LiPF$_6$/LiBF$_4$ = 9/1) EC/VC/GBL = 20/2/78 | 1.00 | 84.1 |
| | 20 | LiCoO$_2$ | Octyl formate | 5 | 1 M (LiPF$_6$/LiBF$_4$ = 9/1) EC/VC/GBL = 20/2/78 | 1.00 | 82.7 |
| | 21 | LiCoO$_2$ | Decyl formate | 0.5 | 1 M (LiPF$_6$/LiBF$_4$ = 9/1) EC/VC/GBL = 20/2/78 | 1.00 | 80.2 |
| Comp. Example | 3 | LiCoO$_2$ | None | 0 | 1 M (LiPF$_6$/LiBF$_4$ = 9/1) EC/VC/GBL = 20/2/78 | 1.00 | 65.1 |
| | 4 | LiCoO$_2$ | Ethyl formate | 1 | 1 M (LiPF$_6$/LiBF$_4$ = 9/1) EC/VC/GBL = 20/2/78 | 1.00 | 71.7 |

Example 22

[Preparation of Nonaqueous Electrolytic Solution]

A nonaqueous solvent of EC:PC:MEC (volumetric ratio)=30:5:65 was prepared, a nonaqueous electrolytic solution was prepared by dissolving LiPF$_6$ in this solvent as an electrolyte salt to give a concentration of 1 M, and then vinyl formate was further added to the electrolytic solution in an amount of 0.5% by weight of the nonaqueous electrolytic solution.

[Production of Lithium Secondary Battery and Measurement of Battery Characteristics]

Ninety % by weight of LiCoO$_2$ (positive electrode active material), 5% by weight of acetylene black (conductive material) and 5% by weight of polyvinylidene fluoride (binder) were mixed. A 1-methyl-2-pyrrolidone solvent was added to this mixture and mixed. The resulting mixture was applied on an aluminium foil, dried, pressure-molded and heated, preparing a positive electrode. An artificial graphite (negative electrode active material) in which the spacing (d$_{002}$) between lattice planes (002) was 0.335 nm and which has a graphite-type crystalline structure and polyvinylidene fluoride (binder) were mixed in the proportion of 95% and 5% by weight respectively. A 1-methyl-2-pyrrolidone solvent was added to this mixture. The resulting mixture was applied on a copper foil, dried, pressure-molded and heated, preparing a negative electrode. A cylindrical battery of 18650 size (diameter: 18 mm, height: 65 mm) was prepared using a separator of a polypropylene microporous film, pouring the nonaqueous electrolytic solution mentioned above and then trapping air having a dew point of −60° C. in the battery before the battery was sealed. The battery was provided with a pressure release vent and an internal current breaker (PTC element). At this time, the electrode density of the positive electrode was 3.6 g/cm$^3$, while that of the negative electrode was 1.7 g/cm$^3$. The thickness (per one side of the collector) of the positive electrode layer was 60 μm, while that of the negative electrode layer (per one side of the collector) was 60 μm.

This 18650 battery was charged at room temperature (25° C.) to 4.2 V at a constant current of 2.2 A (1 C), and was then charged at a constant voltage for the total of 3 hours with the terminal voltage of 4.2 V. Subsequently, the battery was discharged to a terminal voltage of 2.8 V at a constant current of 2.2 A (1 C). This charging and discharging were repeated. The initial discharge capacity was almost equal to that of when 1 M LiPF$_6$-EC/PC/MEC (volumetric ratio:30/5/65) with no vinyl formate added was used as a nonaqueous electrolytic solution (Comparative Example 5). The battery characteristics determined after conducting 200 cycles showed that the discharge capacity retention, when the initial discharge capacity was 100%, was 81.7%. Conditions for preparing a 18650 battery and its battery characteristics are shown in Table 3.

Example 23

A nonaqueous electrolytic solution was prepared, a cylindrical battery of 18650 size was produced and the cycle of charging and discharging was repeated in a manner similar to Example 22 except that allyl formate was used as an additive in an amount of 1% by weight of the nonaqueous electrolytic solution. The results are shown in Table 3.

Example 24

A nonaqueous electrolytic solution was prepared, a cylindrical battery of 18650 size was produced and the cycle of charging and discharging was repeated in a manner similar to Example 22 except that 2-propynyl formate was used as an additive in an amount of 1% by weight of the nonaqueous electrolytic solution. The results are shown in Table 3.

Example 25

A nonaqueous electrolytic solution was prepared, a cylindrical battery of 18650 size was produced and the cycle of charging and discharging was repeated in a manner similar to Example 22 except that 1-methyl-2-propynyl formate was used as an additive in an amount of 5% by weight of the nonaqueous electrolytic solution. The results are shown in Table 3.

Example 26

A nonaqueous electrolytic solution was prepared, a cylindrical battery of 18650 size was produced and the cycle of charging and discharging was repeated in a manner similar to Example 22 except that 1,1-dimethyl-2-propynyl formate was used as an additive in an amount of 1% by weight of the nonaqueous electrolytic solution. The results are shown in Table 3.

Example 27

A nonaqueous electrolytic solution was prepared, a cylindrical battery of 18650 size was produced and the cycle of charging and discharging was repeated in a manner similar to Example 22 except that $LiMn_2O_4$ was used as the positive electrode (positive electrode active material) and 2-propynyl formate was used as an additive in an amount of 1% by weight. The results are shown in Table 3.

Comparative Example 5

A nonaqueous electrolytic solution was prepared, a cylindrical battery of 18650 size was produced and the cycle of charging and discharging was repeated in a manner similar to Example 22 except that no additives were used. The results are shown in Table 3.

Comparative Example 6

A nonaqueous electrolytic solution was prepared, a cylindrical battery of 18650 size was produced and the cycle of charging and discharging was repeated in a manner similar to Example 22 except that 2-propynyl acetate was used as an additive in an amount of 1% by weight of the nonaqueous electrolytic solution. The results are shown in Table 3.

TABLE 3

|  |  | Positive electrode | Compound | Amount added wt % | Composition of electrolytic solution (volumetric ratio) | Initial discharge capacity (relative value) | Retention of discharge capacity after 200 cycles (%) |
|---|---|---|---|---|---|---|---|
| Example | 22 | $LiCoO_2$ | Vinyl formate | 0.5 | 1 M $LiPF_6$ EC/PC/MEC = 30/5/65 | 1.00 | 81.7 |
|  | 23 | $LiCoO_2$ | Allyl formate | 1 | 1 M $LiPF_6$ EC/PC/MEC = 30/5/65 | 1.00 | 83.7 |
|  | 24 | $LiCoO_2$ | 2-Propynyl formate | 1 | 1 M $LiPF_6$ EC/PC/MEC = 30/5/65 | 1.00 | 84.4 |
|  | 25 | $LiCoO_2$ | 1-Methyl-2-propynyl formate | 5 | 1 M $LiPF_6$ EC/PC/MEC = 30/5/65 | 1.00 | 83.4 |
|  | 26 | $LiCoO_2$ | 1,1-Dimethyl-2-propynyl formate | 1 | 1 M $LiPF_6$ EC/PC/MEC = 30/5/65 | 1.00 | 83.5 |
|  | 27 | $LiMn_2O_4$ | 2-Propynyl formate | 1 | 1 M $LiPF_6$ EC/PC/MEC = 30/5/65 | 0.89 | 80.1 |
| Comp. Example | 5 | $LiCoO_2$ | None | 0 | 1 M $LiPF_6$ EC/PC/MEC = 30/5/65 | 0.99 | 70.9 |
|  | 6 | $LiCoO_2$ | 2-Propynyl acetate | 1 | 1 M $LiPF_6$ EC/PC/MEC = 30/5/65 | 1.00 | 73.3 |

Examples 28 to 29

Nonaqueous electrolytic solutions were prepared, cylindrical batteries of 18650 size were produced and the cycle of charging and discharging was repeated in a manner similar to Example 22 except that $LiCo_{1/3}Ni_{1/3}Mn_{1/3}O_2$ was used as the positive electrode (positive electrode active material) and 2-propynyl formate and 2-butyne-1,4-diol diformate were used, respectively, as additives in an amount of 1% by weight each. The results are shown in Table 4.

TABLE 4

|  |  | Positive electrode | Compound | Amount added wt % | Composition of electrolytic solution (volumetric ratio) | Initial discharge capacity (relative value) | Retention of discharge capacity after 200 cycles (%) |
|---|---|---|---|---|---|---|---|
| Example | 28 | $LiCo_{1/3}Ni_{1/3}Mn_{1/3}O_2$ | 2-Propynyl formate | 1 | 1 M $LiPF_6$ EC/PC/MEC = 30/5/65 | 1.01 | 84.8 |
|  | 29 | $LiCo_{1/3}Ni_{1/3}Mn_{1/3}O_2$ | 2-Butyne-1,4-diol diformate | 1 | 1 M $LiPF_6$ EC/PC/MEC = 30/5/65 | 1.01 | 86.3 |

INDUSTRIAL APPLICABILITY

A lithium secondary battery having excellent battery characteristics such as battery cycling property, electrical capacity and storage property can be obtained using the nonaqueous electrolytic solution of the present invention. In addition, the obtained lithium secondary battery can be suitably used as a cylindrical battery, square-shaped battery, coin-shaped battery, laminated battery and the like.

The invention claimed is:

1. A nonaqueous electrolytic solution for a lithium secondary battery, comprising:

an electrolyte salt dissolved in a nonaqueous solvent, wherein the nonaqueous electrolytic solution comprises from 0.01 to 10% by weight of at least one formic ester compound selected from the group consisting of formulae (I) to (III), V and VIII:

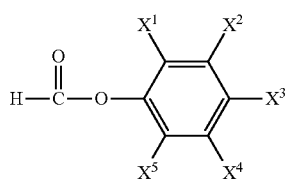

wherein $X^1$ to $X^5$ are each independently a hydrogen atom, a halogen atom, a $C_1$ to $C_6$ linear or branched alkyl group, a cyclohexyl group or a phenyl group;

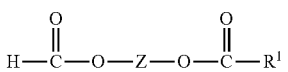

wherein $R^1$ is a hydrogen atom, a $C_1$ to $C_{12}$ linear or branched alkyl group, a $C_3$ to $C_8$ cycloalkyl group or a $C_6$ to $C_{12}$ aryl group; and Z is a $C_2$ to $C_{12}$ saturated or unsaturated hydrocarbon group;

$$(HCOO)_m{-}W{-}(OCOR^1)_n \quad (III)$$

wherein m is an integer of 1 to 4;

n is an integer of 0 to 3; and

W is a $C_3$ to $C_8$ (m+n)-valent linking group consisting of carbon atoms and hydrogen atoms;

(m+n) is 3 or 4; and $R^1$ is defined above;

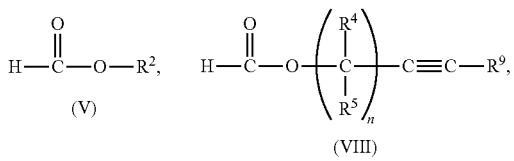

wherein $R^2$ is a $C_6$ to $C_{20}$ linear or branched alkyl group;

$R^4$ and $R^5$ are each, independently a hydrogen atom or a $C_1$ to $C_8$ alkyl group;

$R^9$ is a $C_1$ to $C_{20}$ linear or branched alkyl group, a $C_1$ to $C_{20}$ linear or branched alkenyl group or a $C_1$ to $C_{20}$ linear or branched alkynyl group; and n is an integer of 1 to 10.

2. The nonaqueous electrolytic solution as defined in claim 1, wherein the formic ester compound of formula (I) is at least one selected from the group consisting of phenyl formate, o-fluorophenyl formate, m-fluorophenyl formate, p- fluorophenyl formate, pentafluorophenyl formate, 4-cyclohexylphenyl formate and biphenyl formate.

3. The nonaqueous electrolytic solution as defined in claim 1, wherein the formic ester compound of formula (II) is at least one selected from the group consisting of ethylene glycol diformate, 1,3-propanediol diformate, 1,4-butanediol diformate, 1,2-propanediol diformate, 1,3-butanediol diformate, 2-methyl-1,3-propanediol diformate and 1,1,3-trimethyl-1,3-propanediol diformate.

4. The nonaqueous electrolytic solution as defined in claim 1, wherein the formic ester compound of formula (II) is at least one selected from the group consisting of 2-butene-1,4-diol diformate, 2-butyne-1,4-diol diformate, 3-hexyne-2,5-diol diformate, 2,5-dimethyl-3-hexyne-2,5-diol diformate, 2,4-hexadiyne-1,6-diol diformate and 1,1,6,6-tetramethyl-2,4-hexadiyne-1,6-diol diformate.

5. The nonaqueous electrolytic solution as defined in claim 1, wherein the formic ester compound of formula (II) is at least one selected from the group consisting of ethylene glycol formate acetate, 1,3-propanediol formate acetate, 1,4-butanediol formate acetate, 1,2-propanediol formate acetate, 1,2-butanediol formate acetate, 1,3-butanediol formate acetate, 2-methyl-1,3-propanediol formate acetate and 1,3-dimethyl-1,4-butanediol formate acetate.

6. The nonaqueous electrolytic solution as defined in claim 1, wherein the formic ester compound of formula (V) is at least one selected from the group consisting of hexyl formate, heptyl formate, octyl formate and decyl formate.

7. The nonaqueous electrolytic solution as defined in claim 1, wherein the formic ester compound of formula (VIII) is at least one selected from the group consisting of propynyl formate, butynyl formate, 2-pentynyl formate, 1-methyl-2-propynyl formate, 1-methyl-2-butynyl formate, 1,1-dimethyl-2-propynyl formate, 1,1-diethyl-2-propynyl formate and 1-ethyl-1 -methyl-2-propynyl formate.

8. The nonaqueous electrolytic solution as defined in claim 1, wherein the nonaqueous solvent comprises one or more nonaqueous solvents selected from the group consisting of ethylene carbonate, propylene carbonate, methyl ethyl carbonate, vinylene carbonate, fluoroethylene carbonate and γ-butyrolactone.

9. The nonaqueous electrolytic solution as defined in claim 1, wherein the nonaqueous solvent comprises a cyclic carbonate and a linear carbonate, and a volumetric ratio of the cyclic carbonate to the linear carbonate in the nonaqueous solvent is from 20:80 to 40:60.

10. A lithium secondary battery, comprising:
a positive electrode;
a negative electrode; and
a nonaqueous electrolytic solution comprising an electrolyte salt dissolved in a nonaqueous solvent;
wherein
the positive electrode comprises a lithium compound oxide material,
the negative electrode comprises a material which occludes and releases lithium, and
the nonaqueous electrolytic solution comprises from 0.01 to 10% by weight of at least one formic ester compound selected from the group consisting of compounds of formulae (I), (II), (III), (V) and (VIII):

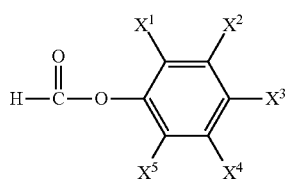
(I)

wherein
$X^1$ to $X^5$ are each independently a hydrogen atom, a halogen atom, a $C_1$ to $C_6$ linear or branched alkyl group, a cyclohexyl group or a phenyl group;

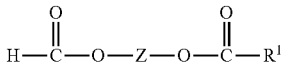
(II)

wherein
$R^1$ is a hydrogen atom, a $C_1$ to $C_{12}$ linear or branched alkyl group, a $C_3$ to $C_8$ cycloalkyl group or a $C_6$ to $C_{12}$ aryl group; and
$Z$ is a $C_2$ to $C_{12}$ saturated or unsaturated hydrocarbon group;

$$(HCOO)_m\text{—}W\text{—}(OCOR^1)_n \qquad (III)$$

wherein
m is an integer of 1 to 4;
n is an integer of 0 to 3; and
W is a $C_3$ to $C_8$ (m+n)-valent linking group consisting of carbon atoms and hydrogen atoms;
(m+n) is 3 or 4; and
$R^1$ is defined above;

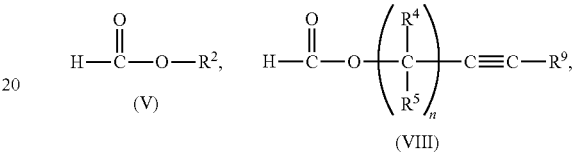

wherein
$R^2$ is a $C_6$ to $C_{20}$ linear or branched alkyl group;
$R^4$ and $R^5$ are each, independently a hydrogen atom or a $C_1$ to $C_8$ alkyl group;
$R^9$ is a $C_1$ to $C_{20}$ linear or branched alkyl group, a $C_1$ to $C_{20}$ linear or branched alkenyl group or a $C_1$ to $C_{20}$ linear or branched alkynyl group; and
n is an integer of 1 to 10.

11. The lithium secondary battery as defined in claim 10, wherein the negative electrode comprises a carbon material and the electrolyte salt is $LiPF_6$, $LiBF_4$, or a mixture thereof.

* * * * *